United States Patent
Mayya et al.

(10) Patent No.: US 10,938,693 B2
(45) Date of Patent: *Mar. 2, 2021

(54) METHOD AND SYSTEM OF RESILIENCY IN CLOUD-DELIVERED SD-WAN

(71) Applicant: Nicira, Inc., Palo Alto, CA (US)

(72) Inventors: Ajit Ramachandra Mayya, Saratoga, CA (US); Parag Pritam Thakore, Los Gatos, CA (US); Stephen Craig Connors, San Jose, CA (US); Steven Michael Woo, Los Altos, CA (US); Sunil Mukundan, Chennai (IN); Thomas Harold Speeter, San Martin, CA (US)

(73) Assignee: NICIRA, INC., Palo Alto, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/724,154

(22) Filed: Dec. 20, 2019

(65) Prior Publication Data

US 2020/0127905 A1    Apr. 23, 2020

Related U.S. Application Data

(63) Continuation of application No. 15/701,115, filed on Sep. 11, 2017, now Pat. No. 10,523,539.

(Continued)

(51) Int. Cl.
*H04L 12/26* (2006.01)
*H04L 12/707* (2013.01)
(Continued)

(52) U.S. Cl.
CPC .......... *H04L 43/08* (2013.01); *H04L 12/2856* (2013.01); *H04L 12/66* (2013.01);
(Continued)

(58) Field of Classification Search
CPC ....... H04L 43/08; H04L 43/106; H04L 47/22; H04L 43/0817; H04L 12/2856;
(Continued)

(56) References Cited

U.S. PATENT DOCUMENTS 5,652,751 A   7/1997   Sharony
5,909,553 A   6/1999   Campbell et al.
(Continued)

FOREIGN PATENT DOCUMENTS

EP   1912381 A1   4/2008
EP   3041178 A1   7/2016
(Continued)

OTHER PUBLICATIONS

Mudigonda, Jayaram, et al., "NetLord: A Scalable Multi-Tenant Network Architecture for Virtualized Datacenters," Proceedings of the ACM SIGCOMM 2011 Conference, Aug. 15-19, 2011, 12 pages, ACM, Toronto, Canada.

(Continued)

*Primary Examiner* — Kyung H Shin
(74) *Attorney, Agent, or Firm* — Adeli LLP

(57) ABSTRACT

In one aspect, a computerized method includes the step of providing process monitor in a Gateway. The method includes the step of, with the process monitor, launching a Gateway. Daemon (GWD). The GWD runs a GWD process that implements a Network Address Translation (NAT) process. The NAT process includes receiving a set of data packets from one or more Edge devices and forwarding the set of data packets to a public Internet. The method includes the step of receiving another set of data packets from the public Internet and forwarding the other set of data packets to the one or more Edge devices. The method includes the step of launching a Network Address Translation daemon (NATD). The method includes the step of detecting that the (Continued)

GWD process is interrupted; moving the NAT process to the NATD.

20 Claims, 5 Drawing Sheets

Related U.S. Application Data

(60) Provisional application No. 62/523,477, filed on Jun. 22, 2017.

(51) Int. Cl.

| | | |
|---|---|---|
| *H04L 12/721* | (2013.01) | |
| *H04L 12/28* | (2006.01) | |
| *H04L 12/729* | (2013.01) | |
| *H04L 12/24* | (2006.01) | |
| *H04L 12/725* | (2013.01) | |
| *H04L 12/815* | (2013.01) | |
| *H04L 12/66* | (2006.01) | |
| *H04L 29/12* | (2006.01) | |

(52) U.S. Cl.
CPC ........ *H04L 41/5032* (2013.01); *H04L 43/045* (2013.01); *H04L 45/123* (2013.01); *H04L 45/124* (2013.01); *H04L 45/125* (2013.01); *H04L 45/22* (2013.01); *H04L 45/302* (2013.01); *H04L 45/70* (2013.01); *H04L 47/22* (2013.01); *H04L 61/25* (2013.01); *H04L 12/2854* (2013.01); *H04L 43/087* (2013.01); *H04L 43/0829* (2013.01); *H04L 43/16* (2013.01)

(58) Field of Classification Search
CPC ....... H04L 45/26; H04L 43/045; H04L 45/22; H04L 45/70; H04L 45/125; H04L 41/5032; H04L 45/302; H04L 45/123; H04L 45/124; H04L 12/66; H04L 61/25; H04L 43/16; H04L 43/087; H04L 43/0829; H04L 12/2854
See application file for complete search history.

(56) References Cited

U.S. PATENT DOCUMENTS

| | | | |
|---|---|---|---|
| 6,154,465 A | | 11/2000 | Pickett |
| 6,157,648 A | | 12/2000 | Voit et al. |
| 6,201,810 B1 | | 3/2001 | Masuda et al. |
| 6,363,378 B1 | | 3/2002 | Conklin et al. |
| 6,445,682 B1 | | 9/2002 | Weitz |
| 6,744,775 B1 | | 6/2004 | Beshai et al. |
| 6,976,087 B1 | | 12/2005 | Westfall et al. |
| 7,003,481 B2 | | 2/2006 | Banka et al. |
| 7,280,476 B2 | | 10/2007 | Anderson |
| 7,313,629 B1 | | 12/2007 | Nucci et al. |
| 7,320,017 B1 | | 1/2008 | Kurapati et al. |
| 7,581,022 B1 | | 8/2009 | Griffin et al. |
| 7,680,925 B2 | | 3/2010 | Sathyanarayana et al. |
| 7,681,236 B2 | | 3/2010 | Tamura et al. |
| 7,962,458 B2 | | 6/2011 | Holenstein et al. |
| 8,094,575 B1 | | 1/2012 | Vadlakonda et al. |
| 8,094,659 B1 | | 1/2012 | Arad |
| 8,111,692 B2 | | 2/2012 | Ray |
| 8,224,971 B1 | | 7/2012 | Miller et al. |
| 8,228,928 B2 | | 7/2012 | Parandekar et al. |
| 8,243,589 B1 | | 8/2012 | Trost et al. |
| 8,259,566 B2 | | 9/2012 | Chen et al. |
| 8,274,891 B2 | | 9/2012 | Averi et al. |
| 8,301,749 B1 | | 10/2012 | Finklestein et al. |
| 8,385,227 B1 | | 2/2013 | Downey |
| 8,566,452 B1 | | 10/2013 | Goodwin et al. |
| 8,661,295 B1 | | 2/2014 | Khanna et al. |
| 8,724,456 B1 | | 5/2014 | Hong et al. |
| 8,724,503 B2 | | 5/2014 | Johnsson et al. |
| 8,745,177 B1 | | 6/2014 | Kazerani et al. |
| 8,799,504 B2 | | 8/2014 | Capone et al. |
| 8,804,745 B1 | | 8/2014 | Sinn |
| 8,806,482 B1 | | 8/2014 | Nagargadde et al. |
| 8,856,339 B2 | | 10/2014 | Mestery et al. |
| 8,964,548 B1 | | 2/2015 | Keralapura et al. |
| 8,989,199 B1 | | 3/2015 | Sella et al. |
| 9,009,217 B1 | | 4/2015 | Nagargadde et al. |
| 9,055,000 B1 | | 6/2015 | Ghosh et al. |
| 9,060,025 B2 | | 6/2015 | Xu |
| 9,071,607 B2 | | 6/2015 | Twitchell, Jr. |
| 9,075,771 B1 | | 7/2015 | Gawali et al. |
| 9,137,334 B2 | | 9/2015 | Zhou |
| 9,154,327 B1 | | 10/2015 | Marino et al. |
| 9,306,949 B1 | | 4/2016 | Richard et al. |
| 9,336,040 B2 | | 5/2016 | Dong et al. |
| 9,354,983 B1 * | | 5/2016 | Yenamandra ....... G06F 11/1464 |
| 9,356,943 B1 | | 5/2016 | Lopilato et al. |
| 9,379,981 B1 | | 6/2016 | Zhou et al. |
| 9,413,724 B2 | | 8/2016 | Xu |
| 9,419,878 B2 | | 8/2016 | Hsiao et al. |
| 9,432,245 B1 | | 8/2016 | Sorenson et al. |
| 9,438,566 B2 | | 9/2016 | Zhang et al. |
| 9,450,817 B1 | | 9/2016 | Bahadur et al. |
| 9,450,852 B1 | | 9/2016 | Chen et al. |
| 9,462,010 B1 | | 10/2016 | Stevenson |
| 9,467,478 B1 | | 10/2016 | Khan et al. |
| 9,485,163 B1 | | 11/2016 | Fries et al. |
| 9,521,067 B2 | | 12/2016 | Michael et al. |
| 9,525,564 B2 | | 12/2016 | Lee |
| 9,602,389 B1 | | 3/2017 | Maveli et al. |
| 9,608,962 B1 | | 3/2017 | Chang |
| 9,621,460 B2 | | 4/2017 | Mehta et al. |
| 9,641,551 B1 | | 5/2017 | Kariyanahalli |
| 9,665,432 B2 | | 5/2017 | Kruse et al. |
| 9,686,127 B2 | | 6/2017 | Ramachandran et al. |
| 9,715,401 B2 | | 7/2017 | Devine et al. |
| 9,717,021 B2 | | 7/2017 | Hughes et al. |
| 9,722,815 B2 | | 8/2017 | Mukundan et al. |
| 9,755,965 B1 | | 9/2017 | Yadav et al. |
| 9,787,559 B1 * | | 10/2017 | Schroeder ............... H04L 43/08 |
| 9,807,004 B2 | | 10/2017 | Koley et al. |
| 9,825,822 B1 | | 11/2017 | Holland |
| 9,825,911 B1 | | 11/2017 | Brandwine |
| 9,825,992 B2 | | 11/2017 | Xu |
| 9,832,128 B1 | | 11/2017 | Ashner et al. |
| 9,906,401 B1 | | 2/2018 | Rao |
| 9,930,011 B1 | | 3/2018 | Clemons, Jr. et al. |
| 9,942,787 B1 | | 4/2018 | Tillotson |
| 10,038,601 B1 | | 7/2018 | Becker et al. |
| 10,057,183 B2 | | 8/2018 | Salle et al. |
| 10,057,294 B2 | | 8/2018 | Xu |
| 10,135,789 B2 | | 11/2018 | Mayya et al. |
| 10,142,226 B1 | | 11/2018 | Wu et al. |
| 10,178,032 B1 | | 1/2019 | Freitas |
| 10,187,289 B1 | | 1/2019 | Chen et al. |
| 10,229,017 B1 | | 3/2019 | Zou et al. |
| 10,237,123 B2 | | 3/2019 | Dubey et al. |
| 10,263,832 B1 | | 4/2019 | Ghosh |
| 10,320,664 B2 | | 6/2019 | Nainar et al. |
| 10,326,830 B1 | | 6/2019 | Singh |
| 10,348,767 B1 | | 7/2019 | Lee et al. |
| 10,425,382 B2 | | 9/2019 | Mayya et al. |
| 10,454,714 B2 | | 10/2019 | Mayya et al. |
| 10,498,652 B2 | | 12/2019 | Mayya et al. |
| 10,523,539 B2 | | 12/2019 | Mayya et al. |
| 10,554,538 B2 | | 2/2020 | Spohn et al. |
| 10,560,431 B1 | | 2/2020 | Chen et al. |
| 10,565,464 B2 | | 2/2020 | Han et al. |
| 10,574,528 B2 | | 2/2020 | Mayya et al. |
| 10,594,516 B2 | | 3/2020 | Cidon et al. |
| 10,608,844 B2 | | 3/2020 | Cidon et al. |
| 10,666,460 B2 | | 5/2020 | Cidon et al. |
| 10,686,625 B2 | | 6/2020 | Cidon et al. |
| 10,749,711 B2 | | 8/2020 | Mukundan et al. |
| 10,778,466 B2 | | 9/2020 | Cidon et al. |
| 10,778,528 B2 | | 9/2020 | Mayya et al. |

(56) References Cited

U.S. PATENT DOCUMENTS

| | | |
|---|---|---|
| 10,805,114 B2 | 10/2020 | Cidon et al. |
| 10,805,272 B2 | 10/2020 | Mayya et al. |
| 2002/0198840 A1 | 12/2002 | Banka et al. |
| 2003/0088697 A1 | 5/2003 | Matsuhira |
| 2003/0112808 A1 | 6/2003 | Solomon |
| 2003/0126468 A1 | 7/2003 | Markham |
| 2003/0161313 A1* | 8/2003 | Jinmei ............... H04L 12/2856 370/392 |
| 2003/0189919 A1 | 10/2003 | Gupta et al. |
| 2003/0202506 A1 | 10/2003 | Perkins et al. |
| 2003/0219030 A1 | 11/2003 | Gubbi |
| 2004/0059831 A1 | 3/2004 | Chu et al. |
| 2004/0068668 A1 | 4/2004 | Lor et al. |
| 2004/0224771 A1 | 11/2004 | Chen et al. |
| 2005/0078690 A1 | 4/2005 | DeLangis |
| 2005/0154790 A1 | 7/2005 | Nagata et al. |
| 2005/0172161 A1 | 8/2005 | Cruz et al. |
| 2005/0265255 A1 | 12/2005 | Kodialam et al. |
| 2006/0002291 A1 | 1/2006 | Alicherry et al. |
| 2006/0114838 A1 | 6/2006 | Mandavilli et al. |
| 2006/0171365 A1 | 8/2006 | Borella |
| 2006/0182034 A1 | 8/2006 | Klinker et al. |
| 2006/0193247 A1 | 8/2006 | Naseh et al. |
| 2007/0064604 A1 | 3/2007 | Chen et al. |
| 2007/0064702 A1 | 3/2007 | Bates et al. |
| 2007/0091794 A1 | 4/2007 | Filsfils et al. |
| 2007/0121486 A1 | 5/2007 | Guichard et al. |
| 2007/0130325 A1 | 6/2007 | Lesser |
| 2007/0177511 A1 | 8/2007 | Das et al. |
| 2007/0237081 A1 | 10/2007 | Kodialam et al. |
| 2007/0260746 A1 | 11/2007 | Mirtorabi et al. |
| 2007/0268882 A1 | 11/2007 | Breslau et al. |
| 2008/0002670 A1 | 1/2008 | Bugenhagen et al. |
| 2008/0049621 A1 | 2/2008 | McGuire et al. |
| 2008/0080509 A1 | 4/2008 | Khanna et al. |
| 2008/0095187 A1 | 4/2008 | Jung et al. |
| 2008/0144532 A1 | 6/2008 | Chamarajanagar et al. |
| 2008/0219276 A1 | 9/2008 | Shah |
| 2008/0240121 A1 | 10/2008 | Xiong et al. |
| 2009/0013210 A1 | 1/2009 | McIntosh et al. |
| 2009/0125617 A1 | 5/2009 | Klessig et al. |
| 2009/0154463 A1 | 6/2009 | Hines et al. |
| 2009/0247204 A1 | 10/2009 | Sennett et al. |
| 2009/0276657 A1 | 11/2009 | Wetmore et al. |
| 2009/0303880 A1 | 12/2009 | Maltz et al. |
| 2010/0008361 A1 | 1/2010 | Guichard et al. |
| 2010/0017802 A1 | 1/2010 | Lojewski |
| 2010/0046532 A1 | 2/2010 | Okita |
| 2010/0088440 A1 | 4/2010 | Banks et al. |
| 2010/0091823 A1 | 4/2010 | Retana et al. |
| 2010/0107162 A1 | 4/2010 | Edwards et al. |
| 2010/0118727 A1 | 5/2010 | Draves et al. |
| 2010/0191884 A1 | 7/2010 | Holenstein et al. |
| 2010/0223621 A1 | 9/2010 | Joshi et al. |
| 2010/0309841 A1 | 12/2010 | Conte |
| 2010/0309912 A1 | 12/2010 | Mehta et al. |
| 2010/0322255 A1 | 12/2010 | Hao et al. |
| 2010/0332657 A1 | 12/2010 | Elyashev et al. |
| 2011/0007752 A1 | 1/2011 | Silva et al. |
| 2011/0032939 A1 | 2/2011 | Nozaki et al. |
| 2011/0040814 A1 | 2/2011 | Higgins |
| 2011/0075674 A1 | 3/2011 | Li et al. |
| 2011/0107139 A1 | 5/2011 | Middlecamp et al. |
| 2011/0110370 A1 | 5/2011 | Moreno et al. |
| 2011/0141877 A1 | 6/2011 | Xu et al. |
| 2011/0142041 A1 | 6/2011 | Imai |
| 2011/0153909 A1 | 6/2011 | Dong |
| 2012/0008630 A1 | 1/2012 | Ould-Brahim |
| 2012/0027013 A1 | 2/2012 | Napierala |
| 2012/0157068 A1 | 6/2012 | Eichen et al. |
| 2012/0173694 A1 | 7/2012 | Yan et al. |
| 2012/0173919 A1 | 7/2012 | Patel et al. |
| 2012/0221955 A1 | 8/2012 | Raleigh et al. |
| 2012/0250682 A1 | 10/2012 | Vincent et al. |
| 2012/0250686 A1 | 10/2012 | Vincent et al. |
| 2012/0300615 A1 | 11/2012 | Kempf et al. |
| 2012/0317291 A1 | 12/2012 | Wolfe |
| 2013/0019005 A1 | 1/2013 | Hui et al. |
| 2013/0021968 A1 | 1/2013 | Reznik et al. |
| 2013/0044764 A1 | 2/2013 | Casado et al. |
| 2013/0051399 A1 | 2/2013 | Zhang et al. |
| 2013/0054763 A1 | 2/2013 | Merwe et al. |
| 2013/0103834 A1 | 4/2013 | Dzerve et al. |
| 2013/0124718 A1 | 5/2013 | Griffith et al. |
| 2013/0124911 A1 | 5/2013 | Griffith et al. |
| 2013/0124912 A1 | 5/2013 | Griffith et al. |
| 2013/0128889 A1 | 5/2013 | Mathur et al. |
| 2013/0142201 A1 | 6/2013 | Kim et al. |
| 2013/0173788 A1 | 7/2013 | Song |
| 2013/0182712 A1 | 7/2013 | Aguayo et al. |
| 2013/0191688 A1 | 7/2013 | Agarwal et al. |
| 2013/0238782 A1 | 9/2013 | Zhao et al. |
| 2013/0242718 A1 | 9/2013 | Zhang |
| 2013/0254599 A1 | 9/2013 | Katkar et al. |
| 2013/0258839 A1 | 10/2013 | Wang et al. |
| 2013/0283364 A1 | 10/2013 | Chang et al. |
| 2013/0286846 A1 | 10/2013 | Atlas et al. |
| 2013/0301642 A1 | 11/2013 | Radhakrishnan et al. |
| 2013/0308444 A1 | 11/2013 | Sem-Jacobsen et al. |
| 2013/0315243 A1 | 11/2013 | Huang et al. |
| 2013/0329548 A1 | 12/2013 | Nakil et al. |
| 2013/0329601 A1 | 12/2013 | Yin et al. |
| 2013/0329734 A1 | 12/2013 | Chesla et al. |
| 2014/0019604 A1 | 1/2014 | Twitchell, Jr. |
| 2014/0019750 A1 | 1/2014 | Dodgson et al. |
| 2014/0064283 A1 | 3/2014 | Balus et al. |
| 2014/0092907 A1 | 4/2014 | Sridhar et al. |
| 2014/0108665 A1 | 4/2014 | Arora et al. |
| 2014/0112171 A1 | 4/2014 | Pasdar |
| 2014/0115584 A1 | 4/2014 | Mudigonda et al. |
| 2014/0126418 A1 | 5/2014 | Brendel et al. |
| 2014/0156818 A1 | 6/2014 | Hunt |
| 2014/0156823 A1 | 6/2014 | Liu et al. |
| 2014/0164560 A1 | 6/2014 | Ko et al. |
| 2014/0173113 A1 | 6/2014 | Vemuri et al. |
| 2014/0173331 A1 | 6/2014 | Martin et al. |
| 2014/0208317 A1 | 7/2014 | Nakagawa |
| 2014/0219135 A1 | 8/2014 | Li et al. |
| 2014/0223507 A1 | 8/2014 | Xu |
| 2014/0244851 A1 | 8/2014 | Lee |
| 2014/0258535 A1 | 9/2014 | Zhang |
| 2014/0269690 A1 | 9/2014 | Tu |
| 2014/0279862 A1 | 9/2014 | Dietz et al. |
| 2014/0280499 A1 | 9/2014 | Basavaiah et al. |
| 2014/0317440 A1 | 10/2014 | Biermayr et al. |
| 2014/0337500 A1 | 11/2014 | Lee |
| 2014/0341109 A1 | 11/2014 | Cartmell et al. |
| 2014/0372582 A1 | 12/2014 | Ghanwani et al. |
| 2015/0016249 A1 | 1/2015 | Mukundan et al. |
| 2015/0029864 A1 | 1/2015 | Raileanu et al. |
| 2015/0046572 A1 | 2/2015 | Cheng et al. |
| 2015/0052247 A1 | 2/2015 | Threefoot et al. |
| 2015/0056960 A1 | 2/2015 | Egner et al. |
| 2015/0058917 A1 | 2/2015 | Xu |
| 2015/0088942 A1 | 3/2015 | Shah |
| 2015/0089628 A1 | 3/2015 | Lang |
| 2015/0092603 A1 | 4/2015 | Aguayo et al. |
| 2015/0096011 A1 | 4/2015 | Watt |
| 2015/0134777 A1 | 5/2015 | Onoue |
| 2015/0139238 A1 | 5/2015 | Pourzandi et al. |
| 2015/0146539 A1 | 5/2015 | Mehta et al. |
| 2015/0163152 A1 | 6/2015 | Li |
| 2015/0172121 A1 | 6/2015 | Farkas et al. |
| 2015/0188823 A1 | 7/2015 | Williams et al. |
| 2015/0189009 A1 | 7/2015 | Bemmel |
| 2015/0195178 A1 | 7/2015 | Bhattacharya et al. |
| 2015/0201036 A1 | 7/2015 | Nishiki et al. |
| 2015/0222543 A1 | 8/2015 | Song |
| 2015/0222638 A1 | 8/2015 | Morley |
| 2015/0236945 A1 | 8/2015 | Michael et al. |
| 2015/0236962 A1 | 8/2015 | Veres et al. |
| 2015/0244617 A1 | 8/2015 | Nakil et al. |
| 2015/0249644 A1 | 9/2015 | Xu |
| 2015/0271104 A1 | 9/2015 | Chikkamath et al. |

(56) References Cited

U.S. PATENT DOCUMENTS

| | | |
|---|---|---|
| 2015/0312142 A1 | 10/2015 | Barabash et al. |
| 2015/0334696 A1 | 11/2015 | Gu et al. |
| 2015/0349978 A1 | 12/2015 | Wu et al. |
| 2015/0350907 A1 | 12/2015 | Timariu et al. |
| 2015/0363733 A1 | 12/2015 | Brown |
| 2015/0372943 A1 | 12/2015 | Hasan et al. |
| 2015/0381407 A1 | 12/2015 | Wang et al. |
| 2015/0381493 A1 | 12/2015 | Bansal et al. |
| 2016/0035183 A1 | 2/2016 | Buchholz et al. |
| 2016/0036924 A1 | 2/2016 | Koppolu et al. |
| 2016/0037434 A1 | 2/2016 | Gopal et al. |
| 2016/0072669 A1 | 3/2016 | Saavedra |
| 2016/0080502 A1* | 3/2016 | Yadav ................ H04L 47/22 709/227 |
| 2016/0105392 A1 | 4/2016 | Thakkar et al. |
| 2016/0105471 A1 | 4/2016 | Nunes et al. |
| 2016/0134528 A1 | 5/2016 | Lin et al. |
| 2016/0142373 A1 | 5/2016 | Ossipov |
| 2016/0164832 A1 | 6/2016 | Bellagamba et al. |
| 2016/0164914 A1 | 6/2016 | Madhav et al. |
| 2016/0173338 A1 | 6/2016 | Wolting |
| 2016/0191363 A1 | 6/2016 | Haraszti et al. |
| 2016/0191374 A1 | 6/2016 | Singh et al. |
| 2016/0197834 A1 | 7/2016 | Luft |
| 2016/0197835 A1 | 7/2016 | Luft |
| 2016/0198003 A1 | 7/2016 | Luft |
| 2016/0210209 A1 | 7/2016 | Verkaik et al. |
| 2016/0218947 A1 | 7/2016 | Hughes et al. |
| 2016/0255169 A1 | 9/2016 | Kovvuri et al. |
| 2016/0261495 A1 | 9/2016 | Xia et al. |
| 2016/0261639 A1 | 9/2016 | Xu |
| 2016/0269926 A1 | 9/2016 | Sundaram |
| 2016/0315912 A1 | 10/2016 | Mayya et al. |
| 2016/0323377 A1 | 11/2016 | Einkauf et al. |
| 2016/0352588 A1 | 12/2016 | Subbarayan et al. |
| 2016/0359738 A1 | 12/2016 | Sullenberger et al. |
| 2016/0366187 A1 | 12/2016 | Kamble |
| 2016/0380886 A1 | 12/2016 | Blair et al. |
| 2017/0005986 A1 | 1/2017 | Bansal et al. |
| 2017/0012870 A1 | 1/2017 | Blair et al. |
| 2017/0026283 A1 | 1/2017 | Williams et al. |
| 2017/0026355 A1 | 1/2017 | Mathaiyan et al. |
| 2017/0034046 A1 | 2/2017 | Cai et al. |
| 2017/0034129 A1 | 2/2017 | Sawant et al. |
| 2017/0053258 A1 | 2/2017 | Carney et al. |
| 2017/0055131 A1 | 2/2017 | Kong et al. |
| 2017/0063674 A1 | 3/2017 | Maskalik et al. |
| 2017/0063782 A1 | 3/2017 | Jain et al. |
| 2017/0064005 A1 | 3/2017 | Lee |
| 2017/0093625 A1 | 3/2017 | Pera et al. |
| 2017/0097841 A1 | 4/2017 | Chang et al. |
| 2017/0104755 A1 | 4/2017 | Arregoces et al. |
| 2017/0118173 A1 | 4/2017 | Arramreddy et al. |
| 2017/0123939 A1 | 5/2017 | Maheshwari et al. |
| 2017/0126564 A1 | 5/2017 | Mayya et al. |
| 2017/0134186 A1 | 5/2017 | Mukundan et al. |
| 2017/0139789 A1 | 5/2017 | Fries et al. |
| 2017/0155557 A1 | 6/2017 | Desai et al. |
| 2017/0163473 A1 | 6/2017 | Sadana et al. |
| 2017/0171310 A1 | 6/2017 | Gardner |
| 2017/0181210 A1 | 6/2017 | Nadella et al. |
| 2017/0195169 A1 | 7/2017 | Mills et al. |
| 2017/0201585 A1 | 7/2017 | Doraiswamy et al. |
| 2017/0207976 A1 | 7/2017 | Rovner et al. |
| 2017/0214545 A1 | 7/2017 | Cheng et al. |
| 2017/0214701 A1 | 7/2017 | Hasan |
| 2017/0223117 A1 | 8/2017 | Messerli et al. |
| 2017/0237710 A1 | 8/2017 | Mayya et al. |
| 2017/0257260 A1 | 9/2017 | Govindan et al. |
| 2017/0257309 A1 | 9/2017 | Appanna |
| 2017/0264496 A1 | 9/2017 | Ao et al. |
| 2017/0279717 A1 | 9/2017 | Bethers et al. |
| 2017/0279803 A1 | 9/2017 | Desai et al. |
| 2017/0289002 A1 | 10/2017 | Ganguli et al. |
| 2017/0310641 A1 | 10/2017 | Jiang et al. |
| 2017/0310691 A1 | 10/2017 | Vasseur et al. |
| 2017/0317974 A1 | 11/2017 | Masurekar et al. |
| 2017/0337086 A1 | 11/2017 | Zhu et al. |
| 2017/0339054 A1 | 11/2017 | Yadav et al. |
| 2017/0339070 A1 | 11/2017 | Chang et al. |
| 2017/0364419 A1 | 12/2017 | Lo |
| 2017/0366445 A1 | 12/2017 | Nemirovsky et al. |
| 2018/0007123 A1 | 1/2018 | Cheng et al. |
| 2018/0014051 A1 | 1/2018 | Phillips et al. |
| 2018/0034668 A1 | 2/2018 | Mayya et al. |
| 2018/0041425 A1 | 2/2018 | Zhang |
| 2018/0062914 A1 | 3/2018 | Boutros et al. |
| 2018/0062917 A1 | 3/2018 | Chandrashekhar et al. |
| 2018/0063036 A1 | 3/2018 | Chandrashekhar et al. |
| 2018/0063233 A1 | 3/2018 | Park |
| 2018/0069924 A1 | 3/2018 | Tumuluru et al. |
| 2018/0074909 A1 | 3/2018 | Bishop et al. |
| 2018/0077081 A1 | 3/2018 | Lauer et al. |
| 2018/0077202 A1 | 3/2018 | Xu |
| 2018/0084081 A1 | 3/2018 | Kuchibhotla et al. |
| 2018/0114569 A1 | 4/2018 | Strachan et al. |
| 2018/0131720 A1 | 5/2018 | Hobson et al. |
| 2018/0145899 A1 | 5/2018 | Rao |
| 2018/0167378 A1 | 6/2018 | Kostyukov et al. |
| 2018/0176073 A1 | 6/2018 | Dubey et al. |
| 2018/0176082 A1 | 6/2018 | Katz et al. |
| 2018/0176130 A1 | 6/2018 | Banerjee et al. |
| 2018/0213472 A1 | 7/2018 | Ishii et al. |
| 2018/0219765 A1 | 8/2018 | Michael et al. |
| 2018/0219766 A1 | 8/2018 | Michael et al. |
| 2018/0234300 A1 | 8/2018 | Mayya et al. |
| 2018/0260125 A1 | 9/2018 | Botes et al. |
| 2018/0262468 A1 | 9/2018 | Kumar et al. |
| 2018/0270104 A1 | 9/2018 | Zheng et al. |
| 2018/0278541 A1 | 9/2018 | Wu et al. |
| 2018/0295529 A1 | 10/2018 | Jen et al. |
| 2018/0302286 A1 | 10/2018 | Mayya et al. |
| 2018/0302321 A1 | 10/2018 | Manthiramoorthy et al. |
| 2018/0351855 A1 | 12/2018 | Sood et al. |
| 2018/0351862 A1 | 12/2018 | Jeganathan et al. |
| 2018/0351863 A1 | 12/2018 | Vairavakkalai et al. |
| 2018/0351882 A1 | 12/2018 | Jeganathan et al. |
| 2018/0373558 A1 | 12/2018 | Chang et al. |
| 2018/0375744 A1 | 12/2018 | Mayya et al. |
| 2018/0375824 A1 | 12/2018 | Mayya et al. |
| 2018/0375967 A1 | 12/2018 | Pithawala et al. |
| 2019/0014038 A1 | 1/2019 | Ritchie |
| 2019/0020588 A1 | 1/2019 | Twitchell, Jr. |
| 2019/0020627 A1 | 1/2019 | Yuan |
| 2019/0028552 A1 | 1/2019 | Johnson et al. |
| 2019/0036810 A1 | 1/2019 | Michael et al. |
| 2019/0046056 A1 | 2/2019 | Khachaturian et al. |
| 2019/0058657 A1 | 2/2019 | Chunduri et al. |
| 2019/0058709 A1 | 2/2019 | Kempf et al. |
| 2019/0068470 A1 | 2/2019 | Mirsky |
| 2019/0068493 A1 | 2/2019 | Ram et al. |
| 2019/0068500 A1 | 2/2019 | Hira |
| 2019/0075083 A1 | 3/2019 | Mayya et al. |
| 2019/0103990 A1 | 4/2019 | Cidon et al. |
| 2019/0103991 A1 | 4/2019 | Cidon et al. |
| 2019/0103992 A1 | 4/2019 | Cidon et al. |
| 2019/0103993 A1 | 4/2019 | Cidon et al. |
| 2019/0104035 A1 | 4/2019 | Cidon et al. |
| 2019/0104049 A1 | 4/2019 | Cidon et al. |
| 2019/0104050 A1 | 4/2019 | Cidon et al. |
| 2019/0104051 A1 | 4/2019 | Cidon et al. |
| 2019/0104052 A1 | 4/2019 | Cidon et al. |
| 2019/0104053 A1 | 4/2019 | Cidon et al. |
| 2019/0104063 A1 | 4/2019 | Cidon et al. |
| 2019/0104064 A1 | 4/2019 | Cidon et al. |
| 2019/0104109 A1 | 4/2019 | Cidon et al. |
| 2019/0104111 A1 | 4/2019 | Cidon et al. |
| 2019/0104413 A1 | 4/2019 | Cidon et al. |
| 2019/0140889 A1 | 5/2019 | Mayya et al. |
| 2019/0140890 A1 | 5/2019 | Mayya et al. |
| 2019/0158605 A1 | 5/2019 | Markuze et al. |
| 2019/0199539 A1 | 6/2019 | Deng et al. |
| 2019/0238364 A1 | 8/2019 | Boutros et al. |
| 2019/0238449 A1 | 8/2019 | Michael et al. |

(56) References Cited

U.S. PATENT DOCUMENTS

| | | |
|---|---|---|
| 2019/0238450 A1 | 8/2019 | Michael et al. |
| 2019/0268421 A1 | 8/2019 | Markuze et al. |
| 2019/0280962 A1 | 9/2019 | Michael et al. |
| 2019/0280963 A1 | 9/2019 | Michael et al. |
| 2019/0280964 A1 | 9/2019 | Michael et al. |
| 2019/0313907 A1 | 10/2019 | Khachaturian et al. |
| 2019/0364099 A1 | 11/2019 | Thakkar et al. |
| 2019/0372888 A1 | 12/2019 | Michael et al. |
| 2019/0372889 A1 | 12/2019 | Michael et al. |
| 2019/0372890 A1 | 12/2019 | Michael et al. |
| 2020/0014615 A1 | 1/2020 | Michael et al. |
| 2020/0014616 A1 | 1/2020 | Michael et al. |
| 2020/0014661 A1 | 1/2020 | Mayya et al. |
| 2020/0021514 A1 | 1/2020 | Michael et al. |
| 2020/0021515 A1 | 1/2020 | Michael et al. |
| 2020/0036624 A1 | 1/2020 | Michael et al. |
| 2020/0059459 A1 | 2/2020 | Abraham et al. |
| 2020/0092207 A1 | 3/2020 | Sipra et al. |
| 2020/0106696 A1 | 4/2020 | Michael et al. |
| 2020/0106706 A1 | 4/2020 | Mayya et al. |
| 2020/0119952 A1 | 4/2020 | Mayya et al. |
| 2020/0153736 A1 | 5/2020 | Liebherr et al. |
| 2020/0235990 A1 | 7/2020 | Janakiraman et al. |
| 2020/0235999 A1 | 7/2020 | Mayya et al. |
| 2020/0244721 A1 | 7/2020 | S et al. |
| 2020/0267184 A1 | 8/2020 | Vera-Schockner |
| 2020/0296026 A1 | 9/2020 | Michael et al. |

FOREIGN PATENT DOCUMENTS

| | | |
|---|---|---|
| WO | 03073701 | 9/2003 |
| WO | 2012167184 A2 | 12/2012 |
| WO | 2017083975 A1 | 5/2017 |
| WO | 2019070611 A1 | 4/2019 |
| WO | 2019094522 A1 | 5/2019 |
| WO | 2020018704 A1 | 1/2020 |
| WO | 2020101922 A1 | 5/2020 |

OTHER PUBLICATIONS

Non-published Commonly Owned U.S. Appl. No. 16/576,751, filed Sep. 19, 2019, 42 pages, Nicira, Inc.

Non-published Commonly Owned U.S. Appl. No. 16/656,555, filed Oct. 17, 2019, 40 pages, Nicira, Inc.

Non-published Commonly Owned U.S. Appl. No. 16/699,719, filed Dec. 1, 2019, 42 pages, Nicira, Inc.

Petition for Post-Grant Review of U.S. Pat. No. 9,722,815, filed May 1, 2018, 106 pages.

Del Piccolo, Valentin, et al., "A Survey of Network Isolation Solutions for Multi-Tenant Data Centers," IEEE Communications Society, Apr. 20, 2016, vol. 18, No. 4, 37 pages, IEEE.

Fortz, Bernard, et al., "Internet Traffic Engineering by Optimizing OSPF Weights," Proceedings IEEE INFOCOM 2000, Conference on Computer Communications, Nineteenth Annual Joint Conference of the IEEE Computer and Communications Societies, Mar. 26-30, 2000, 11 pages, IEEE, Tel Aviv, Israel, Israel.

Francois, Frederic, et al., "Optimizing Secure SDN-enabled Inter-Data Centre Overlay Networks through Cognitive Routing," 2016 IEEE 24th International Symposium on Modeling, Analysis and Simulation of Computer and Telecommunication Systems (MASCOTS), Sep. 19-21, 2016, 10 pages, IEEE, London, UK.

Michael, Nithin, et al., "HALO: Hop-by-Hop Adaptive Link-State Optimal Routing," IEEE/ACM Transactions on Networking, Dec. 2015, 14 pages, vol. 23, No. 6, IEEE.

Mishra, Mayank, et al., "Managing Network Reservation for Tenants in Oversubscribed Clouds," 2013 IEEE 21st International Symposium on Modelling, Analysis and Simulation of Computer and Telecommunication Systems, Aug. 14-16, 2013, 10 pages, IEEE, San Francisco, CA, USA.

Non-Published Commonly Owned U.S. Appl. No. 16/945,700, filed Jul. 31, 2020, 37 pages, Nicira, Inc.

Non-Published Commonly Owned U.S. Appl. No. 17/068,603, filed Oct. 12, 2020, 37 pages, Nicira, Inc.

Non-Published Commonly Owned U.S. Appl. No. 16/818,862, filed Mar. 13, 2020, 198 pages, The Mode Group.

Ray, Saikat, et al., "Always Acyclic Distributed Path Computation," University of Pennsylvania Department of Electrical and Systems Engineering Technical Report, May 2008, 16 pages, University of Pennsylvania ScholarlyCommons.

Webb, Kevin C., et al., "Blender: Upgrading Tenant-Based Data Center Networking," 2014 ACM/IEEE Symposium on Architectures for Networking and Communications Systems (ANCS), Oct. 20-21, 2014, 11 pages, IEEE, Marina del Rey, CA, USA.

Yap, Kok-Kiong, et al., "Taking the Edge off with Espresso: Scale, Reliability and Programmability for Global Internet Peering," SIGCOMM '17: Proceedings of the Conference of the ACM Special Interest Group on Data Communication, Aug. 21-25, 2017, 14 pages, Los Angeles, CA.

\* cited by examiner

METHOD AND SYSTEM OF RESILIENCY IN CLOUD-DELIVERED SD-WAN

CLAIM OF BENEFIT TO PRIOR APPLICATIONS

This application is a continuation of U.S. patent application Ser. No. 15/701,115, filed Sep. 11, 2017, now published as U.S. Patent Publication 2018/0375824. U.S. patent application Ser. No. 15/701,115 claims priority to U.S. Provisional Patent Application No. 62/523,477, filed on Jun. 22, 2017. U.S. patent application Ser. No. 15/701,115, now published as U.S. Patent Publication 2018/0375824, and U.S. Provisional Patent Application 62/523,477 are incorporated by reference in their entirety.

FIELD OF THE INVENTION

This application relates generally to computer networking, and more specifically to a system, article of manufacture and method of resiliency in cloud-delivered SD-WAN.

DESCRIPTION OF THE RELATED ART

Traditional methods of ensuring WAN resiliency have focused on two aspects. First, resiliency for traffic between two enterprise sites (not destined for the public Internet). Second, for subsequent flows towards the public Internet (not guaranteeing session continuity). The methods describe here provide for full resiliency for traffic destined for the public Internet including the preservation of existing flows.

BRIEF SUMMARY OF THE INVENTION

In one aspect, a computerized method includes the step of providing process monitor in a Gateway. The method includes the step of, with the process monitor, launching a Gateway Daemon (GWD). The GWD runs a GWD process that implements a Network Address Translation (NAT) process. The NAT process includes receiving a set of data packets from one or more Edge devices and forwarding the set of data packets to a public Internet. The method includes the step of receiving another set of data packets from the public Internet and forwarding the other set of data packets to the one or more Edge devices. The method includes the step of launching a Network Address Translation daemon (NATD). The method includes the step of detecting that the GWD process is interrupted; moving the NAT process to the NATD.

In another aspect, a computerized method is implemented when a public Internet flow is initiated from an Edge device connected to a Gateway system. The method includes the step of, with a GWD, looking up in a local hash table a NAT translation for a data packet's five tuple. The method includes the step of detecting that no NAT translation is extant for the data packet's five tuple. The method includes the step of creating the NAT translation for the data packet's five tuple. The method includes the step of creating returning the NAT translation for the data packet's five tuple to the Gateway system; storing the NAT translation locally in the Gateway system.

Figure 1:
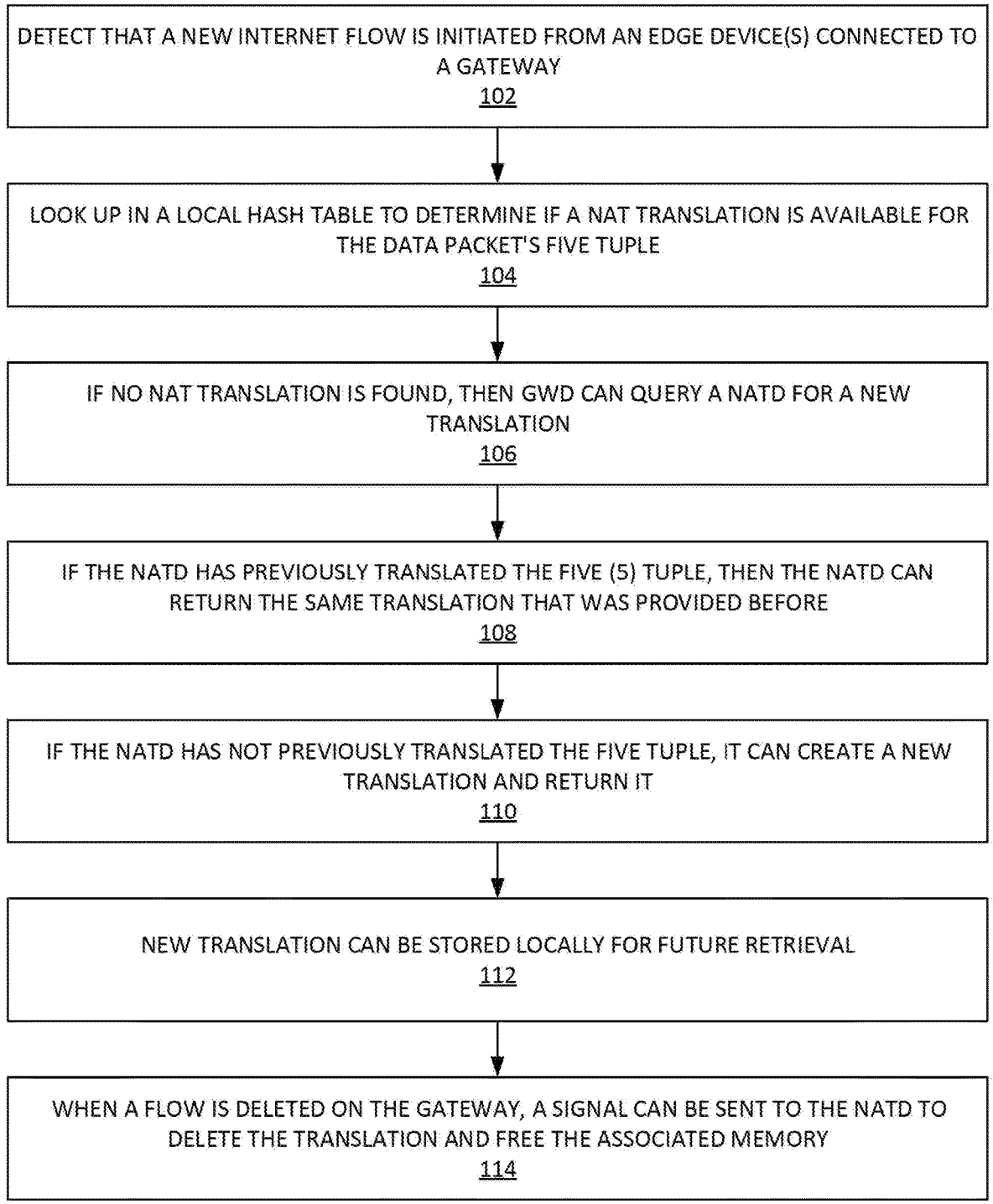
FIG. 1 illustrates an example process of implementing resiliency in an SD-WAN, according to some embodiments.

The Figures described above are a representative set, and are not exhaustive with respect to embodying the invention.

DESCRIPTION

Disclosed are a system, method, and article of manufacture for resiliency in cloud-delivered SD-WAN. The following description is presented to enable a person of ordinary skill in the art to make and use the various embodiments. Descriptions of specific devices, techniques, and applications are provided only as examples. Various modifications to the examples described herein can be readily apparent to those of ordinary skill in the art, and the general principles defined herein may be applied to other examples and applications without departing from the spirit and scope of the various embodiments.

Reference throughout this specification to "one embodiment," "an embodiment," 'one example,' or similar language means that a particular feature, structure, or characteristic described in connection with the embodiment is included in at least one embodiment of the present invention. Thus, appearances of the phrases "in one embodiment," "in an embodiment," and similar language throughout, this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art can recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, and they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Definitions

Example definitions for some embodiments are now provided.

Border Gateway Protocol (BGP) can be a standardized exterior gateway protocol designed to exchange routing and reachability information among autonomous systems (AS) on the Internet.

Cloud computing can involve deploying groups of remote servers and/or software networks that allow centralized data storage and online access to computer services or resources. These groups of remote serves and/or software networks can be a collection of remote computing services.

Daemon can be a background process.

Data center, a physical location housing computing-related gear.

Dynamic tunneling is a transparent mechanism available for applications (e.g. that support the SOCKS4 or SOCKS5 client protocol).

Edge device can be a device that provides an entry point into enterprise or service provider core networks. An edge device can be software running in a virtual machine (VM) located in a branch office and/or customer premises.

Five (5) tuple refers to a set of five different values that comprise a Transmission Control Protocol/Internet Protocol (TCP/IP) connection. It includes a source IP address/port number, destination IP address/port number and the protocol in use.

Flow can be a grouping of packets that match a five (5) tuple which is a combination of Source IP Address (SIP), Destination IP Address (DIP), L4 Source Port (SPORT) and L4 Destination Port (DPORT) and the L4 protocol (PROTO).

Gateway can be a node (e.g. a router) on a computer network that serves as an access point to another network.

Internet Protocol Security (IPsec) can be a protocol suite for securing Internet Protocol (IP) communications by authenticating and encrypting each IP packet of a communication session. In IPsec tunnel mode, the entire IP packet is encrypted and authenticated. It is then encapsulated into a new IP packet with a new IP header. Tunnel mode is used to create virtual private networks for network-to-network communications (e.g. between routers to link sites), host-to-network communications (e.g. remote user access) and host-to-host communications (e.g. private chat).

Inter-process communication (IPC) can include mechanisms an operating system provides to allow the processes to manage shared data. Typically, applications can use IPC, categorized as clients and servers, where the client requests data and the server responds to client requests.

Network Address Translation (NAT) is a method of remapping one IP address space into another by modifying network address information in Internet Protocol (IP) datagram packet headers while they are in transit across a traffic routing device.

Orchestrator can include a software component that provides multi-tenant and role based centralized configuration management and visibility.

Open Shortest Path First (OSPF) can be a routing protocol for Internet Protocol (IP) networks. OSPF can use a link state routing (LSR) algorithm and falls into the group of interior gateway protocols (IGPs), operating within a single autonomous system (AS).

Software-defined networking in a wide area network (SD-WAN) a specific application of software-defined networking (SDN) technology applied to WAN connections, which are used to connect enterprise networks, including branch offices and data centers—over large geographic distances. An SD-WAN can simplify the management and operation of a WAN by decoupling the networking hardware from its control mechanism.

Tunneling protocol can allow a network, user to access or provide a network service that the underlying network does not support or provide directly.

Virtual private network (VPN) can extend a private network across a public network, such as the Internet. It can enable users to send and receive data across shared or public networks as if their computing devices were directly connected to the private network, and thus benefit from the functionality, security and management policies of the private network.

Additional example definitions are provided herein.

Examples Methods

FIG. 1 illustrates an example process of implementing resiliency in an SD-WAN, according to some embodiments. In step 102, it can be detected that a new Internet flow is initiated from an Edge device(s) connected to a Gateway. In step 104, a gateway data daemon (GWD) can look up in a local hash table to determine if a NAT translation is available for the data packet's five tuple. If no NAT translation is found, then, step 106, the GWD can query a Network Address Translation Daemon (NATD) for a new translation. If the NATD has previously translated the five (5) tuple, then, in step 108, the NATD can return the same translation that was provided before, thus ensuring session continuity. If the NATD has not previously translated the five tuple, in step 110, it can create a new translation and return it. In step 112, the new translation can be stored locally for future retrieval. When a flow is deleted on the Gateway, a signal can be sent to the NATD to delete the translation and free the associated memory in step 114.

Example Systems

Figure 2:
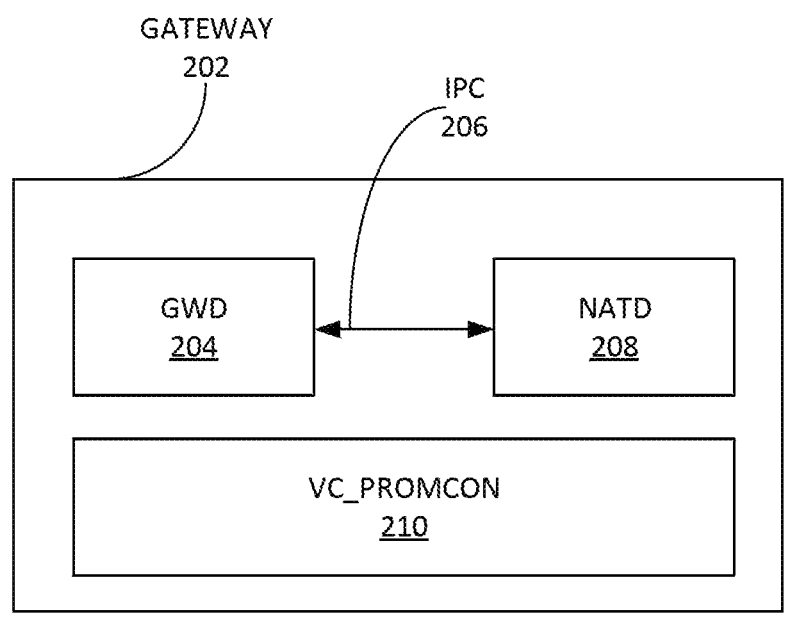
FIG. 2 illustrates an example of a gateway data plane running in a GWD process, according to some embodiments.

FIG. 2 illustrates an example system 200 of a GWD 202 running in a GWD process 204, according to some embodiments. It is noted that GWD 202 can be a daemon. GWD process 204 can be a user-space process running in Linux. In one example, GWD can include a data plane (e.g. Velo-Cloud® data plane, etc.) and control plane software.

It is noted that the data plane includes the forwarding information base (FIB) and mechanisms for transmitting packets. The control plane includes the routing information base (RIB) and mechanisms for instructing Edges how to transmit packets.

In a single device case, GWD can run in a GWD process 204. GWD process 204 can receive data packets (e.g. all data packets) from the various Edge devices and forward them to the Internet, and vice versa. GWD process 204 can be interrupted for multiple reasons. For example, GWD process 204 can encounter a software fault (e.g. a crash). GWD process 204 can be restarted for troubleshooting. GWD process 204 can be restarted as part of a routine software upgrade. In these scenarios, data traffic can continue to flow uninterrupted. This can be achieved by moving the NAT process and its associated state outside the GWD context (e.g. to NATO 208). Accordingly, FIG. 2 illustrates a simplified process diagram of processes running within the Gateway 202. The process monitor (e.g. vc_procmon 210) can launch and manage two separate services independently: GWD and NATD 208. NATD 208 can be a user-space process running in Linux which contains the NAT software (e.g. VeloCloud® NAT software, etc.). NATO 208 stores its own state and communicates via IPC with GWD.

When a new Internet flow is initiated from one of the Edge devices connected to Gateway 202 the following steps can be implemented. In one step, GWD can look up in a local hash table to see if a NAT translation is available for the packet's five tuple. If no NAT translation is found, then GWD queries NATD 208 for a new translation. If NATO 208 has previously translated the five (5) tuple, then NATD can return the same translation that was provided before, ensuring session continuity. If NATD 208 has not previously translated the five tuple, it can create a new translation and return it. The new translation can be stored locally for future retrieval. When a flow is deleted on Gateway 202, a signal can be sent to NATD 208 to delete the translation and free the associated memory.

Figure 3:
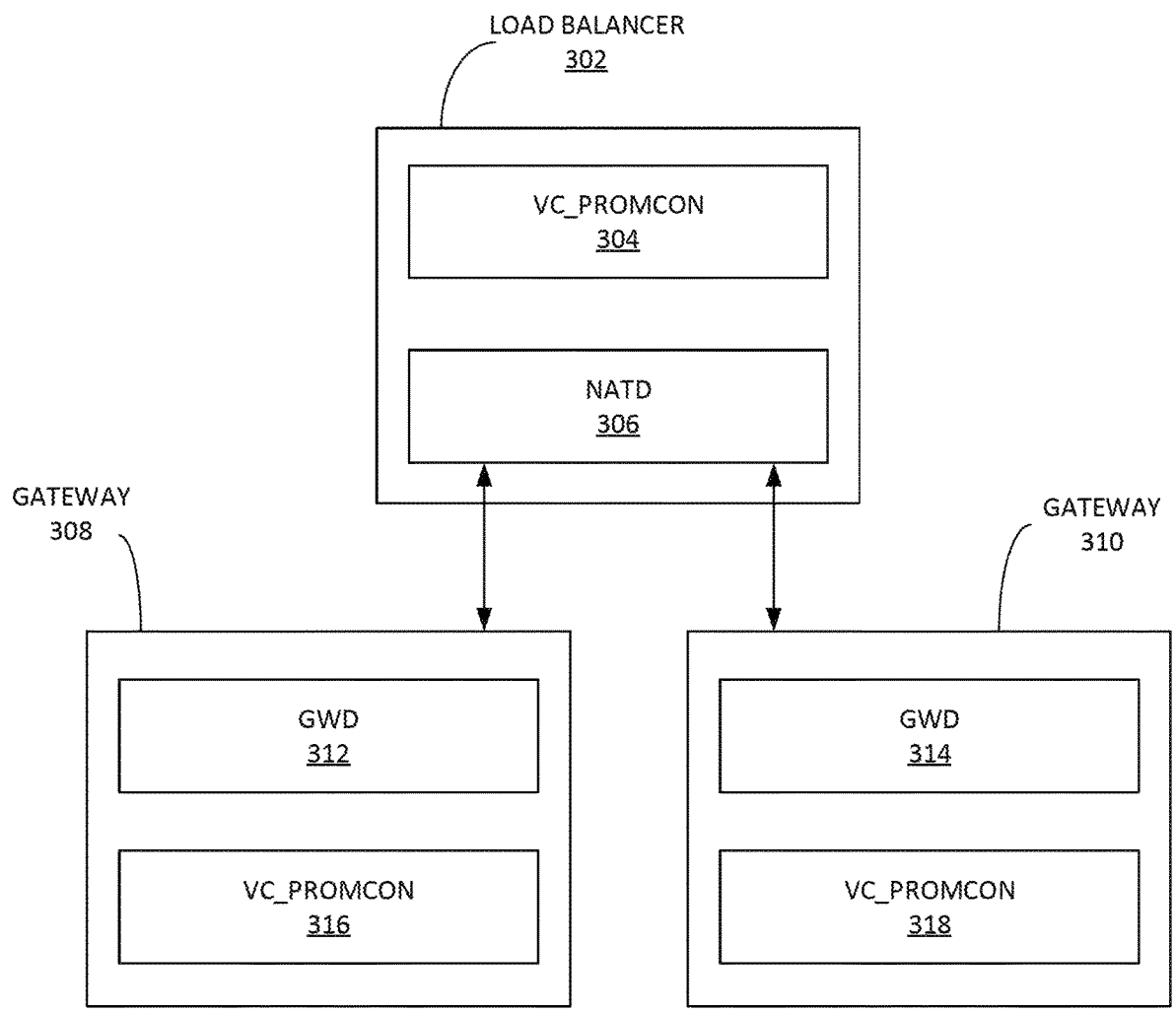
FIG. 3 illustrates an example of multiple physical or virtual instances of the gateway running and fronted by a single NATO daemon, according to some embodiments.

FIG. 3 illustrates an example system 300 of multiple physical or virtual instances of one more gateways 308 and 310 running and fronted by a single NATD daemon 306, according to some embodiments. This can allow for horizontal scaling of resources to provide internet connectivity from a larger number of branch devices. NATO daemon 306 can be implemented in load balancer 302. A process monitor (e.g. vc_procmon 304, 316, and 318) can launch and manage associated services (e.g. GWD 312 and 314, NATO daemon 306). In this scenario, the same NATO instance provides resiliency for NAT translations to multiple GWD instances using the same steps defined above.

It is noted that, in some embodiments, a single instance of the gateway (GWD) can have a finite number of Edge devices that can connect to it before it runs out of resources. In order to expand scale beyond this limit, a cluster of multiple gateway instances can be created and load can be distributed across those instances. These instances can share a single NATD to ensure that even if load is moved from one gateway instance to another, the session continuity is maintained.

Figure 4:
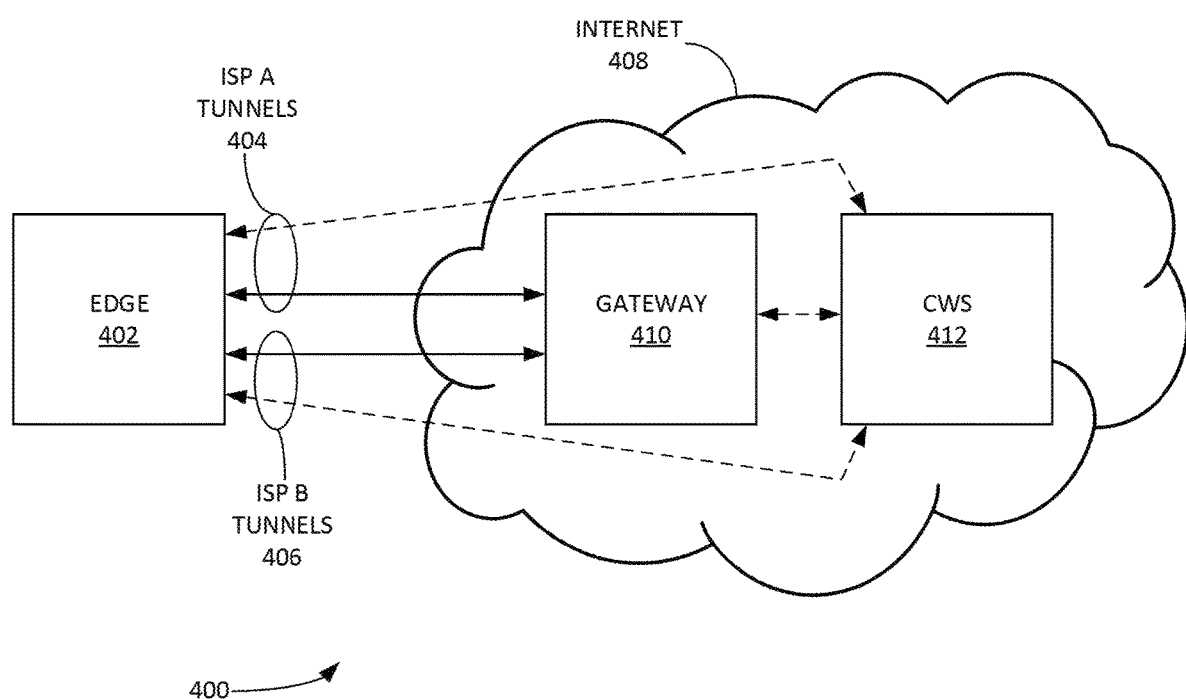
FIG. 4 illustrates an example of cloud traffic can be routed through an external CWS service to enable security scanning and other service insertion on the traffic before it exits to the public internet, according to some embodiments.

FIG. 4 illustrates an example of cloud traffic routed through an external Cloud Web Security (CWS) service to enable security scanning and other service insertion on the traffic before it exits to the public Internet, according to some embodiments. In this scenario, the same NATD instance provides resiliency for NAT translations to multiple GWD instances using the same steps provided supra. In addition to routing traffic via the cloud gateway 410, cloud traffic can be routed through an external Cloud Web Security (CWS) 412 service to enable security scanning and other service insertion on the traffic before it exits to the public Internet. There are two mechanisms provided for connecting to the cloud service, via an aggregated IPsec tunnel through Gateway 410 and via an IPsec tunnel direct from the Edge 402 itself. By tracking the state of various connectivity points, this provides full redundancy for internet traffic even if any one of the tunnels fails.

Figure 5:
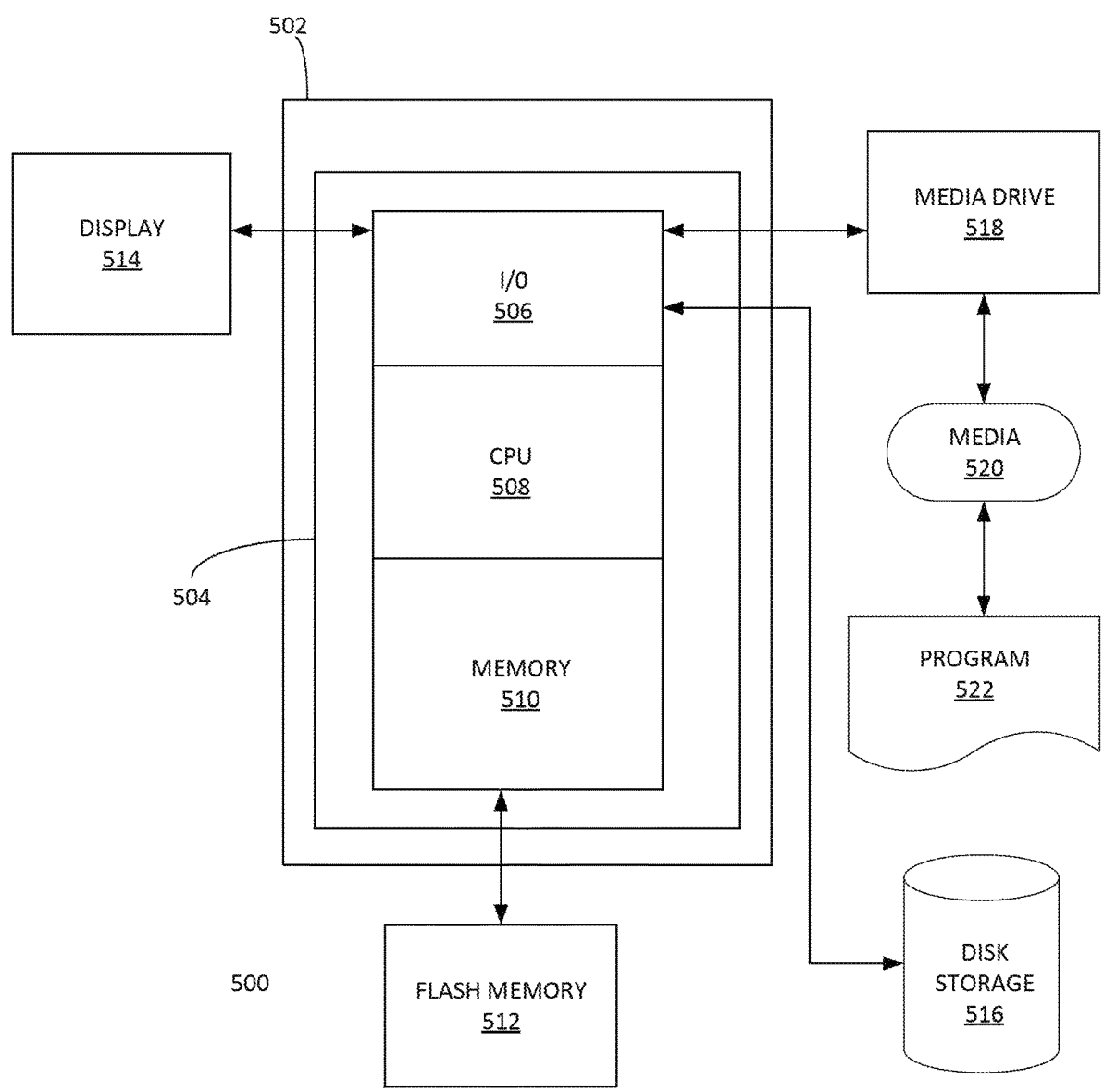
FIG. 5 depicts an exemplary computing system that can be configured to perform any one of the processes provided herein.

There can be three tunnels established in the topology of FIG. 5 which enable the Edge 402 to reach the CWS 412 service. This tunnel is from the Gateway 410 to the CWS 412 service. This tunnel is established per Gateway 410 and one or more edges are assigned to this tunnel via profile, allowing edges to take advantage of the Edge-Gateway Multipath Method and ensure traffic resiliency in reaching the Gateway 410. This tunnel is established from the Edge directly to the CWS 412 service over ISP A 404. This tunnel is established from the Edge directly to the CWS 412 service over ISP B 406. Edge 402 is able to dynamically shift traffic per-packet over the optimal tunnel based on continuous measurement of tunnel state, latency, traffic priority, congestion, etc.

Link Resiliency is now discussed. For resiliency of the individual links, multiple modes are provided. The method can include an Edge-Gateway Multipath Method where both links are considered active. In this topology, the reactivity time for blackout or brownout conditions is three hundred (300) ms and approximate bandwidth consumption on the second link is one thousand two-hundred and fifty (1250) MB per month.

Two additional modes can be provided which reduce the reactivity time but save on bandwidth consumption. The first mode provided is a pure backup mode, wherein tunnels are not established on the WAN link and ICMP probes alone are used to monitor link states. The link is still included in the link state machine tracking availability to determine availability for failover. This availability is reported as status on an Orchestrator and used to generate link up/down alerts though tunnels are not active. In this mode, usage is only twenty (20) MB per month but it may take up to two (2) seconds for the link to take over in case of blackout of the primary link and there is no brownout protection.

In a second mode, the link can be maintained in a "hot standby" mode wherein the tunnels are active however all MP control traffic is not sent across the link. In this mode, reactivity time can be seven-hundred milliseconds (700 ms) for blackout or brownout conditions and the usage is approximately two-hundred and fifty (250) MB per month.

Various cloud resiliency examples are now discussed. For cloud traffic, it can be that traffic continuity is maintained through a single peering, point due to NAT. However, the resiliency methods described above (e.g. multiple devices) can also be applicable to cloud traffic. Because sessions are translated to a given public Internet Protocol (IP) address, resiliency that utilizes multiple devices and instead resiliency behind a single NAT IP address is important. In this regard, the Gateway has the ability to provide resilient connectivity in a single or multi-device topology while preserving NAT state.

Additional Exemplary Computer Architecture and Systems

FIG. 5 depicts an exemplary computing system 500 that can be configured to perform any one of the processes provided herein. In this context, computing system 500 may include, for example, a processor, memory, storage, and I/O devices (e.g., monitor, keyboard, disk drive, Internet connection, etc.). However, computing system 500 may include circuitry or other specialized hardware for carrying out some or all aspects of the processes. In some operational settings, computing system 500 may be configured as a system that includes one or more units, each of which is configured to carry out some aspects of the processes either in software, hardware, or some combination thereof.

FIG. 5 depicts computing system 500 with a number of components that may be used to perform any of the processes described herein. The main system 502 includes a motherboard 504 having an I/O section 506, one or more central processing units (CPU) 508, and a memory section 510, which may have a flash memory card 512 related to it.

The I/O section 506 can be connected to a display 514, a keyboard and/or other user input (not shown), a disk storage unit 516, and a media drive unit 518. The media drive unit 518 can read/write a computer-readable medium 520, which can contain programs 522 and/or data. Computing system 500 can include a web browser. Moreover, it is noted that computing system 500 can be configured to include additional systems in order to fulfill various functionalities. Computing system 500 can communicate with other computing devices based on various computer communication protocols such a Wi-Fi, Bluetooth® (and/or other standards for exchanging data over short distances includes those using short-wavelength radio transmissions), USB, Ethernet, cellular, an ultrasonic local area communication protocol, etc.

CONCLUSION

Although the present embodiments have been described with reference to specific example embodiments, various modifications and changes can be made to these embodiments without departing from the broader spirit and scope of the various embodiments. For example, the various devices, modules, etc. described herein can be enabled and operated using hardware circuitry, firmware, software or any combination of hardware, firmware, and software (e.g., embodied in a machine-readable medium).

In addition, it can be appreciated that the various operations, processes, and methods disclosed herein can be embodied in a machine-readable medium and/or a machine accessible medium compatible with a data processing system (e.g., a computer system), and can be performed in any order (e.g., including using means for achieving the various operations). Accordingly, the specification and drawings are to be regarded in an illustrative rather than a restrictive sense. In some embodiments, the machine-readable medium can be a non-transitory form of machine-readable medium.

What is claimed as new and desired to be protected by Letters Patent of the United States is:

1. A method of establishing a wide area network over cloud datacenters to connect different sites of an enterprise, each site containing a plurality of computers, the method comprising:
    deploying, at an edge of a branch first network, a first device to connect to a second device operating in a cloud datacenter and acting as an access point to a second network of the cloud datacenter;
    establishing first and second links between the first device and the second device;
    establishing at least one tunnel on the first link and designating the first link as an active link; and
    establishing at least one tunnel on the second link and designating the second link as a backup link to use in case the first link fails, wherein the second link is maintained in a hot standby mode during which the at least one tunnel on the second link is active but is not used for transmitting data traffic.

2. The method of claim 1, wherein the first device is an edge device and the second device is a gateway device.

3. The method of claim 1 further comprising performing, at a cloud web security service in the cloud datacenter, security scanning of data traffic from the enterprise first network prior to the data traffic being sent to the public Internet through the second network.

4. The method of claim 3, wherein the cloud web security service performs service insertion for data traffic from the enterprise first network prior to the data traffic being sent to the public Internet.

5. The method of claim 3 further comprising establishing a tunnel from the second device to the cloud web service.

6. The method of claim 1 further comprising performing, at the second device, network address translation for data traffic sent from the first device to the second network.

7. The method of claim 1, wherein the first device executes in a virtual machine located in a branch office.

8. The method of claim 1, wherein the first link uses a first Internet service provider and the second link uses a second Internet service provider.

9. A method of establishing a wide area network over cloud datacenters to connect different sites of an enterprise, each site containing a plurality of computers, the method comprising:
    deploying, at an edge of a branch first network, a first device to connect to a second device operating in a cloud datacenter and acting as an access point to a second network of the cloud datacenter;
    establishing first and second links between the first device and the second device;
    establishing at least one tunnel one at least the first link and designating the first link as an active link; and
    designating the second link as a backup link, wherein if the first link becomes inactive, the second link becomes active and a second tunnel is established on the second link.

10. The method of claim 9, wherein the active first link and the backup second link are both included in a link state machine.

11. The method of claim 10, wherein the link state machine determines availability of links for failover.

12. The method of claim 11, wherein the availability is reported as a link status by a centralized configuration and management application.

13. The method of claim 10 further comprising sending probe packets to monitor a state of the second link without establishing a tunnel on the backup second link in order to save bandwidth of the second link.

14. The method of claim 13, wherein the probe packets are ICMP probe packets.

15. The method of claim 10, wherein the link state machine establishes a set of flags to determine eligibility of the links.

16. The method of claim 9 further comprising establishing a tunnel on the backup second link so that the second link is available in a hot-standby mode.

17. The method of claim 9, wherein the first device is an edge device and the second device is a gateway device.

18. The method of claim 9 further comprising performing, at a cloud web security service in the cloud datacenter, security scanning of data traffic from the enterprise first network prior to the data traffic being sent to the public Internet through the second network.

19. The method of claim 18, wherein the cloud web security service performs service insertion for data traffic from the enterprise first network prior to the data traffic being sent to the public Internet.

20. The method of claim 18 further comprising establishing a tunnel from the second device to the cloud web service.

\* \* \* \* \*